June 26, 1962  J. W. JUNE  3,040,477
ADJUSTABLE TREE LIMB HOLDER
Filed Aug. 26, 1959  2 Sheets-Sheet 1

Jack W. June
INVENTOR.

BY *Clarence A. O'Brien*
*and Harvey B. Jackson*
Attorneys

June 26, 1962　　　J. W. JUNE　　　3,040,477
ADJUSTABLE TREE LIMB HOLDER
Filed Aug. 26, 1959　　　　　　　　　　2 Sheets-Sheet 2
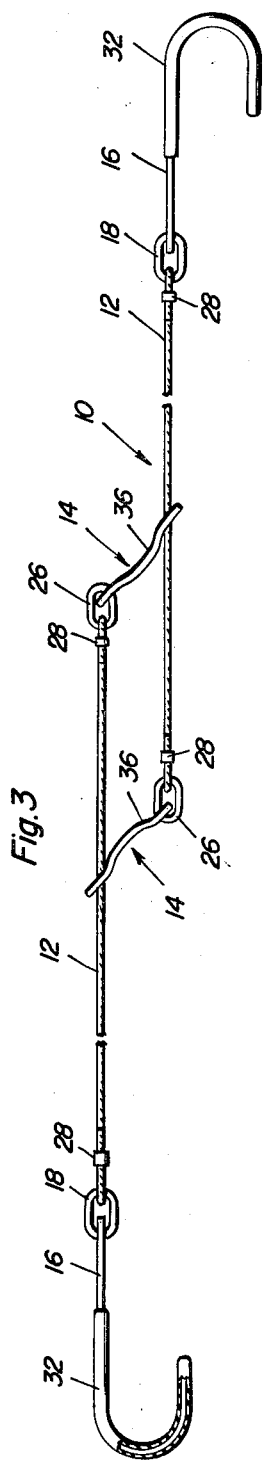
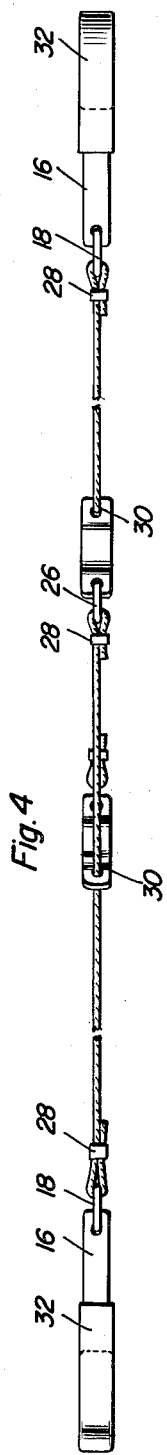
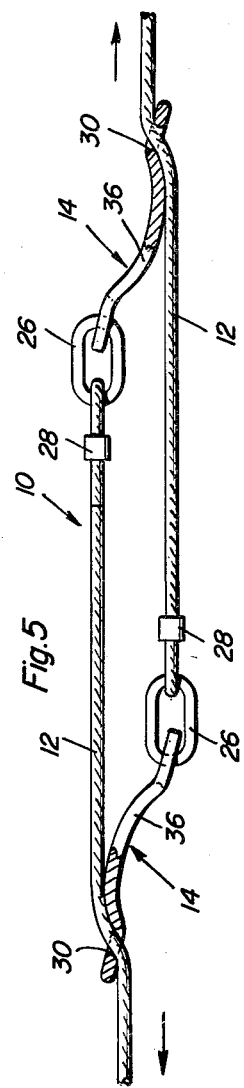
Jack W. June
INVENTOR.
BY *Clarence A. O'Brien*
*and Harvey B. Jacobson*
Attorneys United States Patent Office 3,040,477
Patented June 26, 1962

3,040,477
ADJUSTABLE TREE LIMB HOLDER
Jack W. June, P.O. Box 481, Boonville, Calif.
Filed Aug. 26, 1959, Ser. No. 836,120
8 Claims. (Cl. 47—42)

This invention relates to a new and useful adjustable tree limb holder and more particularly to a tree limb holder which may be readily secured between two limbs of a tree and quickly adjusted in length so as to provide proper support for tree limbs which are either weighted down with an abundance of fruit or the like in the case of trees of a fruit orchard, or for tree limbs which must be supported to either improve upon the appearance of a tree or to save the life of the tree.

With the ever increasing demand for efficiency in the growing of crops, at times it becomes necessary to support the limbs of a fruit tree to insure that the limbs thereof will not be damaged because they bear an overabundance of fruit. Also, in the case of large shade trees and the like it often becomes necessary to brace one or more of the limbs in order to insure that they will not be broken or otherwise damaged due to either the tremendous weight of a large limb or due to some of the detrimental effects of the elements such as snow and ice piling up on the limbs and weighting them down beyond their capacity.

The main object of this invention is to provide an adjustable tree limb holder which may be readily secured between the limbs of a tree to brace either one or more of the limbs to insure that they will not be weighted down beyond their capacity.

A further object of this invention is to provide an adjustable tree limb holder which may be secured between limbs of a tree and readily adjusted to the proper length so as to maintain the proper amount of tension in order to raise or support one or more of the limbs.

Another object of this invention, in accordance with the preceding objects, is to provide an adjustable tree limb holder that does not necessitate the use of a support between the ground and the undersurface of a tree limb.

A still further object, in accordance with the preceding objects, is to provide an adjustable tree limb holder that may be easily constructed of different sizes so as to be adaptable to trees of substantially any size.

A further object in accordance with the preceding objects, is to provide an adjustable tree limb support or holder that may more conveniently be secured to the outer portion of the tree limb which is to be supported insuring that the outer end of the limb will be properly supported.

A final object to be specifically enumerated herein, in accordance with the preceding objects is to provide an adjustable tree limb holder that lends itself to conventional forms of manufacture, is readily adaptable to trees of different sizes, and a tree limb holder that is economically feasible and efficient so as to provide a device that will be useful, inexpensive, and available to practically everybody who desires a tree limb holder of this type.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged elevational view of the adjustable tree limb holder with the gripping slides shown in the sliding position, the plastic coating over one of the limb engaging hooks being shown in section;

FIGURE 4 is a top plan view of the invention as seen in FIGURE 3; and

FIGURE 5 is a further enlarged fragmentary side elevational view of the invention as seen in FIGURE 3 with the holding slides shown in the holding positions, parts of the holding slides being broken away and shown in section.

Figure 1:
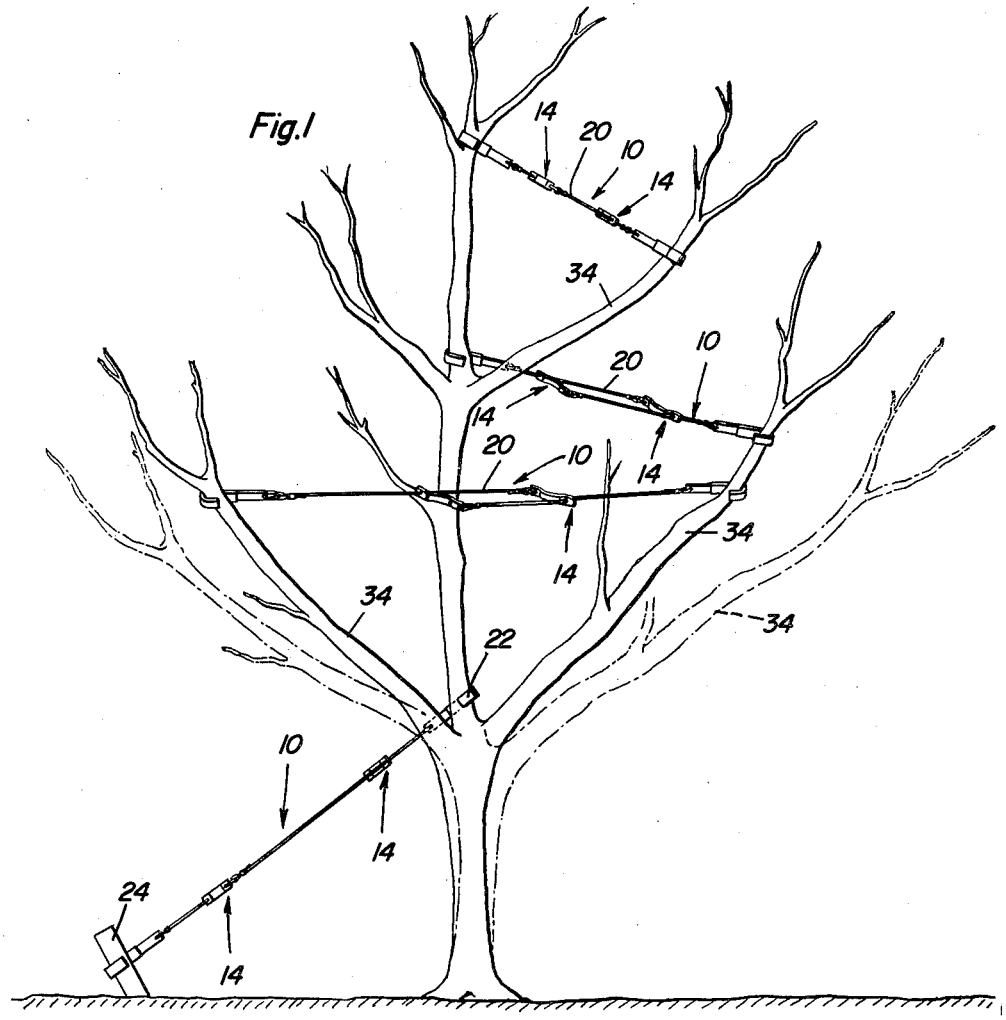
FIGURE 1 is a perspective view of a plurality of the adjustable tree limb holders comprising the present invention shown secured between and supporting various limbs of a tree, the outline of some of the limbs of the tree before being supported being shown in phantom lines.
Figure 2:
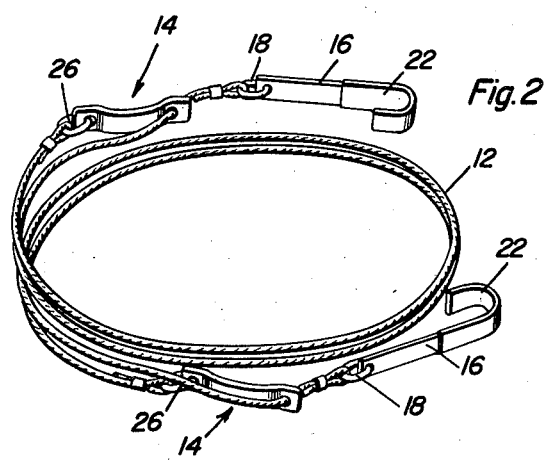
FIGURE 2 is a perspective view of the adjustable tree limb holder with the tension cables shown in a coiled state.

Referring now more specifically to the drawings the numeral 10 generally designates the adjustable tree limb holder of the instant invention which comprises a pair of elongated flexible tensioning members 12 which each have one end overlapping an end portion of the other, the overlapped end of each elongated tensioning member being adjustably secured to the adjacent tensioning member 12 by means of a holding means generally referred to by the reference numeral 14.

With attention now down more particularly to FIGURE 3 of the drawings, it will be noted that the remote ends of the tensioning members 12 are each provided with limb engaging elements 16 which are pivotally secured thereto by means of connecting links 18.

The tensioning members 12 of the tree limb holder 10 are disposed in parallel relation and the limb holder 10 is designed to be secured between two limbs of a tree and adjusted in length so as to be tensioned to retain certain limbs in their correct positions or to supply the necessary support to an overladen limb as at 20, see FIGURE 1. If it is desired, the tree limb holder 10 can be secured to the trunk or a limb of a tree at one end as at 22 and the other end can be secured to a stationary support 24.

The holding means or slides 14 are pivotally secured to the overlapping ends of the flexible tensioning members 12 in any convenient manner such as by connecting rings 26. It is to be understood that the connecting rings 26 and the connecting links 18 may be secured to the corresponding ends of the flexible tensioning members 12 in any convenient manner, such as by forming a loop by passing one end of the tensioning members 12 through the connecting elements and doubling it back upon itself so that it may be secured by means of fasteners 28.

The holding means or slides 14 comprise rigid straplike elements having one end pivotally secured to its respective connecting element and the other end provided with an opening 30 through which the other tensioning member is slidably received. It is to be understood that the openings 30 are of sufficient size to snugly receive therethrough one of the tensioning members 12.

Each of the limb-engaging elements 16 is provided with a resilient sleeve or cover 32 so that any tendency of the holding means or slide 14 to chafe a tree limb will be greatly minimized.

With attention now drawn more particularly to FIGURE 3 of the drawings, it will be noted that although the tensioning members 12 are in parallel relation, that the holding means 14 are so angularly disposed as to allow each of the tensioning members 12 to be slidably received through its corresponding opening 30. From FIGURE 5, it will be noted that when the limb holder 10 is tensioned, that the holding means or slides 14 attain a position which is only slightly angled in respect to the tensioning members 12 and that the edges of the openings 30 kink and frictionally engage the corresponding tensioning member 12. It is to be understood that as more tension is placed on the limb holder 10 that the kinking of the tensioning members 12 and the frictional engagement of the edges of the opening 30 will become greater so as to more tightly retain the tensioning members 12 in adjusted position relative to each other.

The tensioning members 12 are shown in the drawings as flexible steel cables. However, it is to be understood that a strap-like material could be used with slot-like openings in each of the holding means for the tensioning member to pass through, and also that the tensioning members 12 could be either of a non-resilient material or of a resilient material, the latter being more desirable where the tree limbs might possibly be subjected to sufficient wind to cause slack in a non-resilient tree limb holder which might possibly cause either one or more of the limb-engaging elements to be disengaged from their respective limbs. Still further, it is to be understood that the openings 30 could each be provided with a keyhole slot extending to the outer edge of each of the holding means 14 so that the two tensioning members 12 could be readily disengaged so that a tensioning member of a different length could be substituted for a shorter one.

With attention drawn now more particularly to FIGURE 5 of the drawings, it will be seen that each holding slide 16 is provided with an offset mid-portion 36 which maintains the tensioning members 12 in spaced relation where they are overlapped even when the limb holder 10 is tensioned. The offset 36 also serves to provide additional area in frictional engagement with the tensioning members.

In operation, one end of the tree limb holder 10 is secured to either a stationary support 24 or a limb 34 which is to serve as a support and the other end of the tree limb holder is secured to the limb 34 that is to be supported. The latter may then be properly positioned or lifted to the desired position and temporarily braced or propped until the holding means or slide 14 can be adjusted along each of the tensioning members 12 so as to establish the proper length of the tree limb holder 10. After the holder 10 has been adjusted, the brace or prop can be removed and the load transferred to the limb holder 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. For use in redistributing the load borne by the branches of a tree, a tree limb support adapted to apply a tensile force between two portions of a tree comprising a pair of elognated parallel tension members having overlapping ends, cushioned engaging elements on the remote ends of said members for each engaging a portion of a tree to be supported, a pair of elongated holding means each secured to one of said overlapping ends and each having a transverse slot slidably receiving and retaining the other of said overlapping ends, said holding means being each longitudinally bowed between its slot and its attachment to its tension member whereby to provide a curved surface to thereby cause the overlapping end of the other tension member to flex thereabout and increase the frictional engagement of said last mentioned overlapping end with an edge of the slot and with the bowed surface of the associated holding means.

2. An adjustable tree limb holder comprising a pair of elongated flexible tensioning members disposed in parallel relation with one end of each overlapping the adjacent end portion of the other, limb engaging elements secured to the remote ends of said tensioning members, a pair of elongated rigid holding members each secured at one end to the adjacent end of one of said tensioning members, said rigid holding members each having an opening formed in its other end slidably receiving and retaining the other of said overlapping ends, said holding members being each longitudinally bowed between its opening and its attachment to its tensioning member whereby to provide a curved surface to thereby cause the overlapping end of the other tension member to flex thereabout and increase the frictional engagement of said last mentioned overlapping end with an edge of the slot and with the bowed surface of the associated holding member.

3. The combination of claim 2, wherein said limb engaging elements comprise rigid strap-like hooks adapted to embrace a tree limb.

4. The combination of claim 2, wherein said tensioning members are circular in cross-section and said openings are circular in configuration.

5. The combination of claim 2, wherein said limb engaging elements comprise rigid strap-like hooks adapted to embrace a tree limb, said strap-like hooks each having a resilient covering thereon.

6. An adjustable tree limb holder comprising a pair of elongated flexible tensioning members disposed in parallel and overlapping relation, limb engaging elements secured to the remote end of said tensioning members, and holding means carried by the other end of each tensioning member having a portion engaged with and slidable longitudinally along the overlapped portion of the other tensioning member and including means for frictionally gripping the corresponding overlapped portion when the tree holder is tensioned.

7. The combination of claim 6, wherein said holding means each comprises a rigid member having an opening therein slidably receiving the associated flexible element, the edges of said openings providing friction surfaces kinking and frictionally retaining the tensioning member passing therethrough when the latter are tensioned.

8. The combination of claim 6, wherein each of said holding means comprises an elongated rigid member having and opening in one end slightly larger than said flexible elements, the edges of said openings providing friction surfaces kinking and frictionally retaining the tensioning member passing therethrough when the latter are tensioned, said rigid members each including an offset portion whereby said overlapped end portions will be maintained in spaced relation.

References Cited in the file of this patent

UNITED STATES PATENTS

| | | |
|---|---|---|
| 560,391 | Checkley | May 19, 1896 |
| 1,051,208 | Fletcher | Jan. 21, 1913 |
| 1,389,932 | Bosmajian | Sept. 6, 1921 |
| 1,693,180 | Phelp | Nov. 27, 1928 |